March 21, 1933.  E. A. REUSSENZEHN  1,902,100
WEIGHING SCALE
Filed April 8, 1931   2 Sheets-Sheet 1
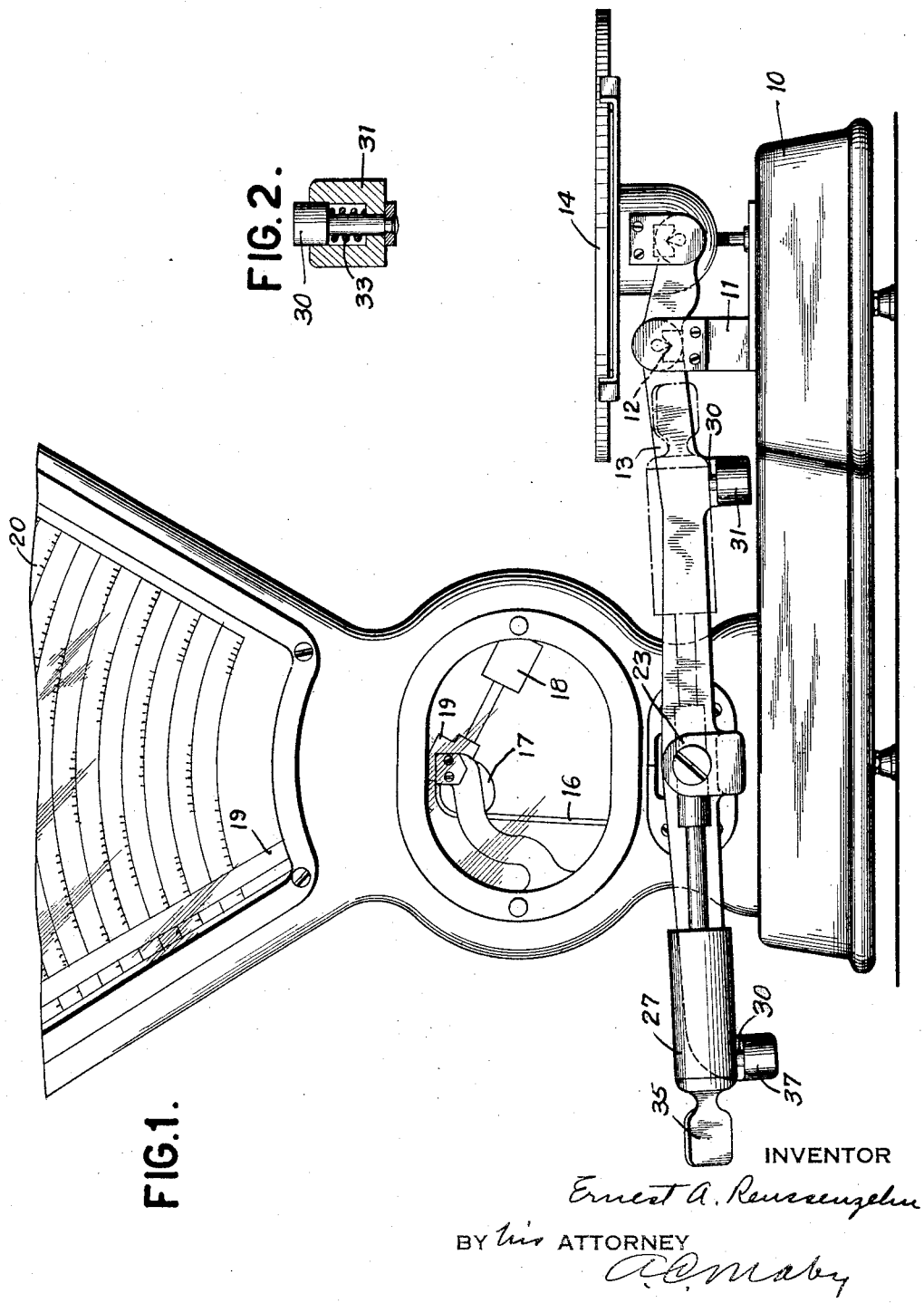
INVENTOR
Ernest A. Reussenzehn
BY his ATTORNEY

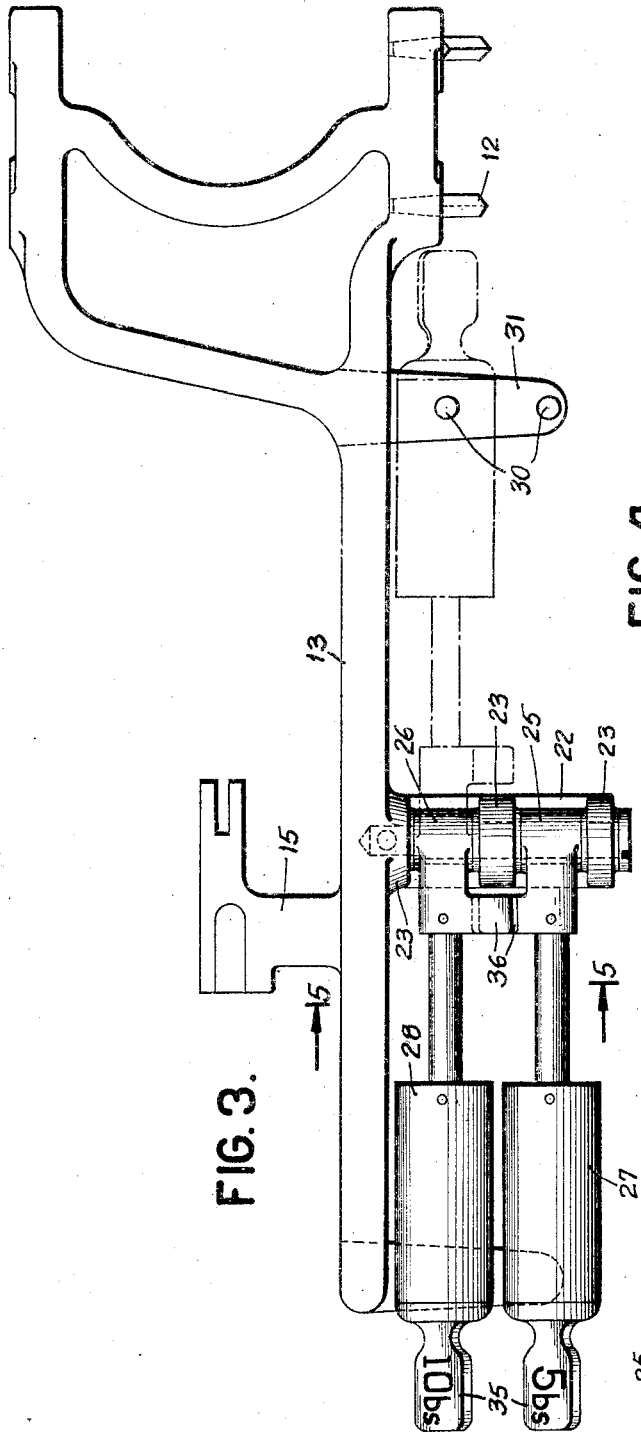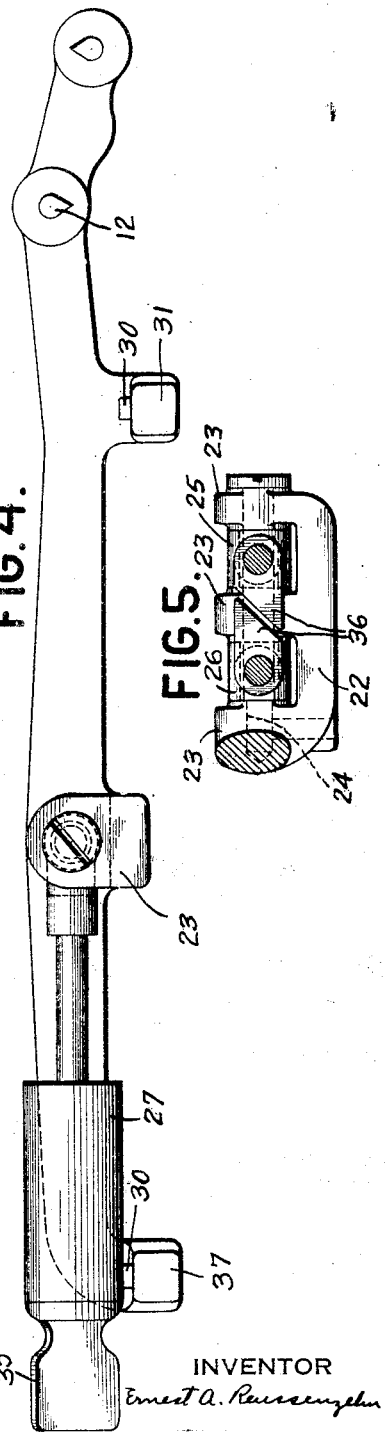

Patented Mar. 21, 1933

1,902,100

UNITED STATES PATENT OFFICE

ERNEST ALBERT REUSSENZEHN, OF DAYTON, OHIO, ASSIGNOR TO DAYTON SCALE COMPANY, OF DAYTON, OHIO, A CORPORATION OF NEW JERSEY

WEIGHING SCALE

Application filed April 8, 1931. Serial No. 528,543.

This case relates to weighing scales and particularly to devices for changing the normal capacity thereof. In scales of the automatic type the normal capacity of the scales is limited by the range of the automatic counterbalancing and indicating mechanism. It is often desirable to weigh loads beyond the automatic capacity of the scale. For this purpose, poises on capacity beams connected to the lever system have been used. This requires accuracy in setting the poise.

The object of the present invention is to avoid the necessity of accurately setting a poise which required a relatively great deal of care and time.

More specifically the object is to provide a novel doubling weight device carried by a scale lever which can be moved to predetermined positions without necessity of making an accurate setting.

Still more specifically the object is to provide two such doubling weights on the same lever with interlocking means between them for predetermining the order in which they may be operated.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a vertical elevation of the scale.

Fig. 2 is a detail of the stop for the doubling weight.

Fig. 3 is a top view of the scale lever with both the doubling weights in operative position.

Fig. 4 is a side view of Fig. 3, and

Fig. 5 is a section on line 5—5 of Fig. 3.

In detail, the scale comprises a base casing 10 on which is mounted the fulcrum stand 11 carrying the bearing 12 for pivotally supporting the base lever 13. The lever is of the first order and supports at its outer end the platform 14. Adjacent the other end of the lever is a right angular projection 15 to which is connected a tape 16 (Fig. 1) attached to the periphery of a cam 17 rigidly movable with a pendulum 18. Also movable with the cam 17 is an indicator 19 which scans a chart 20. Opposite the extension 15 the lever 13 carries at right angles to it a bracket 22 integral with three upstanding lugs 23 in which is supported a pin 24 on which are rotatable the hubs 25 and 26 of the doubling weights 27 and 28 respectively. Normally the doubling weights are in the position shown in dotted lines in Fig. 1 resting on stops 30 on a transverse extension 31 of the lever 13. These stops 30 consist of plungers normally pressed upwardly above the surface of extension 31 by means of a spring 33. When the doubling weights are moved against the plungers the springs 33 take up the shock of impact. With both weights in the dotted line position of Fig. 1 the capacity of the scale is that of the chart 20 as limited by the range of movement of the pendulum 18. Assume the automatic capacity of the scale is ten pounds. If a load of twelve pounds is placed on the platform 14, the indicator 19 will move beyond the range of chart 20.

Accordingly, the scale operator flips the five pound doubling weight 27 from the dotted line position to the full line position shown in Figs. 1, 3, and 4. This offsets a portion of the load on the platform equal to five pounds. The remaining load of nine pounds is automatically offset and indicated by movement of indicator 19 relative to chart 20. The doubling weight 27 has a tab 35 at the free end on which is the indication "5 lbs." which may be seen by the customer after it has been moved to full line position. Thus the customer is informed of the load on the platform non-automatically offset.

Assume that the load on the platform is seventeen pounds. The moving of the five pound doubling weight 27 to the full line position will compensate five pounds of the seventeen pound load, leaving a remainder of twelve pounds which is still beyond the automatic capacity of the scale. The operator then flips the ten pound doubling weight 28 to the full line position which with weight 27 offsets all but two pounds of the load on the platform 14. This two pound remainder is automatically counterbalanced and indicated by the scale. The doubling weight 28 has an indicating tab 35 displaying ten pounds to the customer thereby informing him that the total load on the scale is the ten pounds non-automatically offset plus the indication on the chart 20.

Referring to Fig. 5 it will be noted that the doubling weights 27 and 28 have inclined interlocking portions 36. The object of these inclined surfaces is to compel the operator to move the doubling weights in proper order. Thus from the dotted line position in Fig. 1 it is necessary to move the doubling weight 27 first. If the doubling weight 28 were moved first it would indicate ten pounds offset to the customer which would be incorrect.

By inverting Fig. 5, the relation of weights 27 and 28 when in normal dotted line position may be understood. It will be seen that the weight 28 cannot be moved to full line position before the weight 27 because the inclined portion of weight 28 is beneath the overhanging inclined portion of weight 27. The operator must therefore move weight 27 first and after he has moved the latter he is then able to move the weight 28. The relative position of the weights in full line position may be understood by viewing Fig. 5 right side up. It may then be seen that weight 28 must be returned to normal position before the weight 27. In this manner the proper indication of the non-automatic offset load is always presented to the customer. In full line position the weights rest on stops 30 on a bracket 37 similar to the stops 30 on bracket 31.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a scale, a load support, a lever operated thereby, automatic counterbalancing means, an upright housing therefor, a projection extending into the housing from one side of the lever for connection to the automatic counterbalancing means, a bracket extending transversely to and from the opposite side of said lever, and a weight pivotally connected to said bracket and adapted to swing in a generally vertical plane past the housing from one side of the bracket to the other.

2. In a scale, a load support, a pivoted lever operated thereby, a plurality of weights adjustable on said lever into different positions relative to the lever pivot in each of which they are completely carried by the lever, and means for preventing adjustment of one weight before another.

3. In a scale, a load support, a lever operated thereby, a plurality of weights located side by side and acting on said lever, and interlocking means between said weights for preventing operation of one weight before another.

4. In a scale, a load support, a lever operated thereby, a plurality of weights pivotally connected to said lever, and inter-engaging means on said weights for preventing operation of one weight before another.

5. In a scale, a load support, a lever operated thereby, a plurality of weights, a pivotal connection between the weights and the lever, each weight being movable from a position at one side of the pivotal connection to a position at the other side of the connection, and means for preventing operation of one weight before another.

6. In a scale, a load support, a lever operated thereby, a pair of weights, a pivotal connection between the weights and the lever, said weights being movable from one side of the pivotal connection to another, and interlocking means between the weights effective when the weights are at one side of the connection to prevent operation of the first of said pair before the second and effective when the weights are at the other side of the connection to prevent operation of the second before the first weight.

7. In a scale, a load support, a lever operated thereby, a pair of weights adjustable on said lever, and inclined overlapping engaging surface on the weights for preventing operation of one weight before another, the weights being adjustable in a direction transverse to the inclined surfaces.

8. In a scale, automatic counterbalancing and indicating means, and devices for increasing the capacity of the scale beyond the range of the automatic counterbalancing and indicating means, said devices comprising a plurality of counterbalancing weights, lever means for carrying said weights, adjustment of said weights varying their moment arms on the lever means, and means for causing said weights to be adjusted relative to the lever means in a predetermined order.

9. In a scale, a load support, a lever operated thereby, automatic counterbalancing means connected to the lever, a housing for the counterbalancing means, a plurality of weights carried by the lever and separately operable from one side of the housing to counteract predetermined loads on the support, and indicating devices provided on and movable with the weights brought into view at the side of the housing opposite to aforesaid to indicate the sum total of the load counteracted by these weights.

In testimony whereof I hereto affix my signature.

ERNEST ALBERT REUSSENZEHN.